United States Patent [19]
Christopoulos

[11] Patent Number: 6,031,572
[45] Date of Patent: Feb. 29, 2000

[54] PROGRESSIVE IMAGE CODING

[75] Inventor: Charilaos Christopoulos, Sollentuna, Switzerland

[73] Assignee: Telefonaktiebolaget Lm Ericsson, Stockholm, Sweden

[21] Appl. No.: 09/135,831

[22] Filed: Aug. 18, 1998

Related U.S. Application Data

[63] Continuation of application No. PCT/SE97/00376, Mar. 5, 1997.

[30] Foreign Application Priority Data

Mar. 5, 1996 [JP] Japan ................................. 7-9600853
Oct. 31, 1996 [JP] Japan ................................. 7-9603979

[51] Int. Cl.[7] .................................................. H04N 7/26
[52] U.S. Cl. ................................. 348/397; 348/399
[58] Field of Search .................................. 348/438, 390, 348/397, 398, 399; 382/234, 243; H04N 7/26

[56] References Cited

U.S. PATENT DOCUMENTS 5,204,920  4/1993  Moran et al. ........................... 382/166
5,686,961  11/1997  Gasztonyi ............................... 348/390
5,845,013  12/1998  Bouchard ............................... 348/398

FOREIGN PATENT DOCUMENTS 0 087 284 A1  8/1983  European Pat. Off. .
0 626 790 A1  11/1994  European Pat. Off. .
0 707 427 A2  4/1996  European Pat. Off. .

*Primary Examiner*—Howard Britton
*Attorney, Agent, or Firm*—Nixon & Vanderhye, P.C.

[57] ABSTRACT

A method and a transmission system for use in coding and Progressive Image Transmission (PIT), in which the transmitter at the initial stages of the transmission uses a Region Based Coding (RBC) scheme (905) in order to provide the receiver with an image of good visual quality at a high compression ratio, which the RBC is known to be able to provide. At a later stage of the transmission, when the visual quality of the RBC image is no longer superior to other compression techniques such as JPEG, the PIT switches (903) use a continuous tone compressor (907) for the further transmission, without losing the information contained in the RBC image already transmitted. Also a hybrid RBC-DCT (Discrete Cosine Transform) is used for further improving the performance of the transmission scheme, in which the image segmented by the RBC algorithm is divided into rectangular blocks, and those blocs that are fully contained inside a region of the segmented image are transmitted using predefined base functions such as DCT base functions. Also a method for video coding using a similar scheme is disclosed.

42 Claims, 5 Drawing Sheets

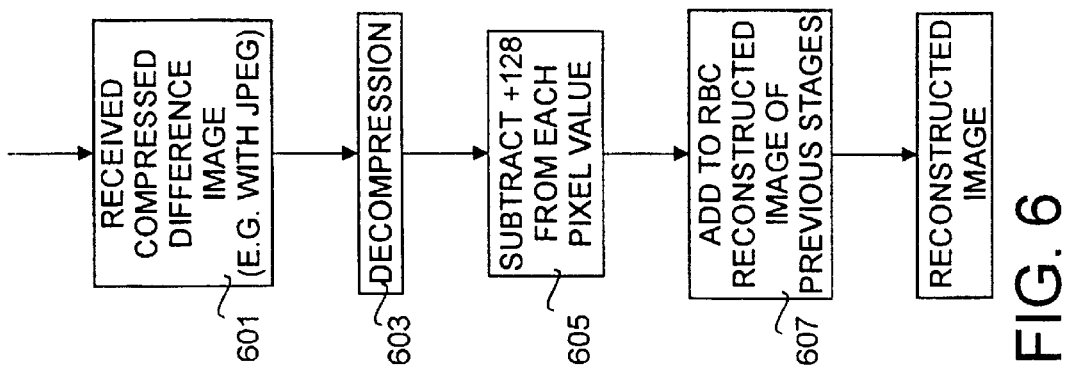
FIG. 6
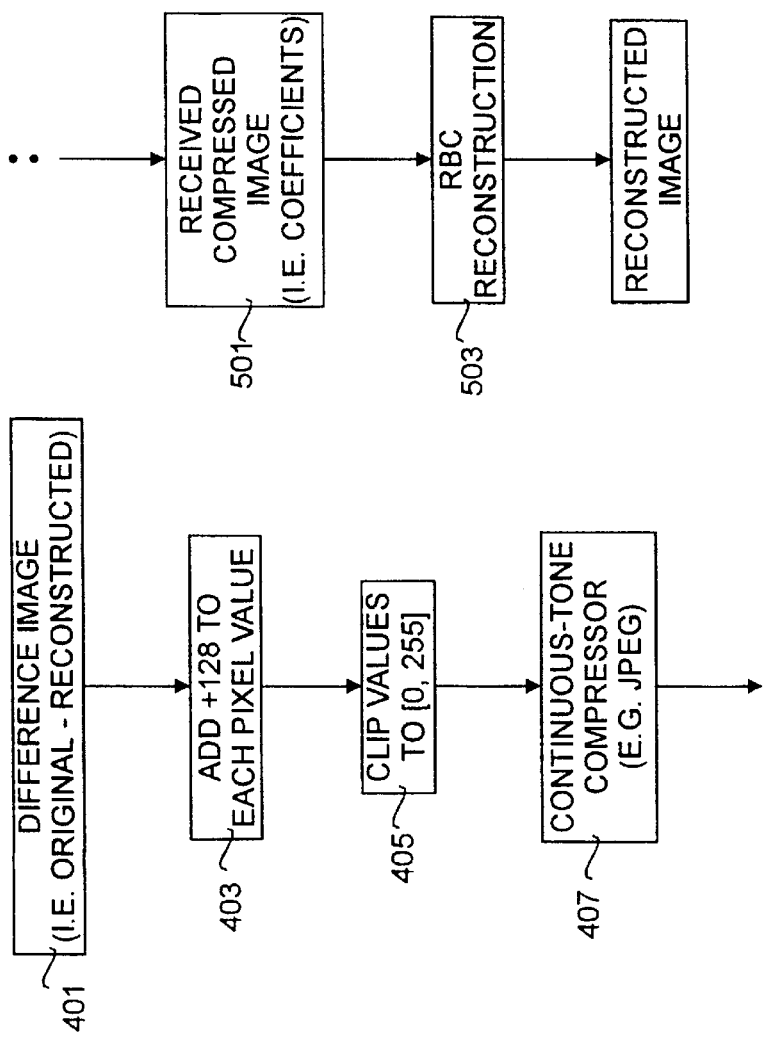
FIG. 5
FIG. 4

PROGRESSIVE IMAGE CODING

This is a continuation of PCT application No. PCT/SE97/00376, filed Mar. 5, 1997.

TECHNICAL FIELD

The invention relates to a method and a system for image and video coding and also to a method and a system for progressive image transmission.

BACKGROUND AND PRIOR ART

Progressive Image Transmission (PIT) is a general term for methods transmitting images, where the information contained in the image is transmitted in such a manner that the quality of the image is gradually improved at the receiving end of the transmission system as more information is transmitted.

Progressive image transmission has been proposed as a part of image transmission systems using low capacity transmission channels, such as the public switched telephone network. The use of a PIT scheme provides a user with an interpretable image faster. This is for instance of interest when many images have to be seen but only a few are of real interest. Thus, the user can decide to reject an image at any time during the transmission and thereby save time by rejecting the not interesting images at an early stage. Large image databases such as those emerging in the medical environment are amongst those which would benefit from such a transmission scheme.

Hence, a demand for an algorithm having features making it useful in and suitable for progressive image coding has emerged. A method possible to use for progressive image coding is the Joint Photographers Expert Group (JPEG) algorithm. The progressive image coding is then achieved using the methods of spectral selection or successive approximation as described in for instance the documents, W. B. Pennebaker, J. T. Mitchell, "JPEG still image data compression standard", Van Nostrand Reinhold, New York, 1993, or in G. K. Wallace, "The JPEG still picture compression standard", Communication of the ACM, Vol. 34, No. 4, April 1988, pp. 121–132.

However, the use or the JPEG algorithm for PIT is associated with some disadvantages. The major disadvantage is the low visual quality during the first stages of the transmission, which mainly is due to blocking artefacts appearing at high compression ratios. Thus, it is common that much information needs to be transmitted in order for the receiver to be able to decide whether or not he/she is interested in the image transmitted.

Recently, segmented image coding (SIC) or region based coding (RBC) approaches have been used for progressive image transmission. Region based coding is a relatively new image compression technique, in which the image is divided into regions of slowly varying intensity. The contours separating different regions are described by means of chain codes, and the image intensity inside such a region is approximated with use of a linear combination of base functions. The contours and the region intensities are then transmitted via a channel in order to provide the receiver with an image.

The RBC based algorithms provide a much better visual quality than e.g. the JPEG algorithm at high compression ratios. The reason for this is the blocking artefacts visible at high compression ratios using the JPEG algorithm. However, at lower compression ratios the visual quality of the RBC based algorithms does not outperform the JPEG algorithm. Moreover, the computational complexity of RBC algorithms is significantly higher than for the JPEG algorithm, which also has the advantage of being commercially available at a comparably low cost.

Most of the present RBC methods, approximate the grey value within a region as a weighted sum of base functions, whereafter the coefficients obtained are quantized and coded. Such techniques are described in: M. Gilge, "Region-orientated transform coding (ROTC) of images", Proc. of ICASSP 90, Albuquerque, New Mexico, April 1990, pp. 2245–2248, and M. Kunt, M. Benard, R. Leonard "Recent results in high compression image coding", IEEE Trans. circuits and systems, Vol. 34, November 1987, pp. 1306–1336.

In more recent RBC based approaches, the basis functions within a given region are orthonormal. The use of orthonormal functions makes it possible to obtain the coefficients of the linear expression independently, with fewer and numerically stable computations. See for instance W. Philips, C. A. Christopoulos, "Fast segmented image coding using weakly separable bases", Proc. of ICASSP 94, Adelaide, Australia, Apr. 19–22, 1994, Vol. V, pp.345–348. However, RBC algorithms have significant computational and memory requirements. This is due to that the orthonormal bases depend on the shape and size of a region and thus new individual bases functions must be computed for each region.

Furthermore, at low compression ratios, RBC does not offer better visual quality than JPEG. Thus, the RBC based algorithms lose their advantage compared to other compression algorithms at lower compression ratios.

SUMMARY OF THE INVENTION

It is an object of the present invention to provide a method and a transmission system for PIT which provides high quality images during all stages of the transmission.

It is also an object of the present invention to provide a method for coding still and moving images combining RBC and block based coding schemes.

It is yet another object of the present invention to obtain a method and a transmission or storage system, which make use of the good initial visual quality of segmented image coding as well as of the low cost high compression achieved with the JPEG algorithm for providing an efficient progressive image transmission.

It is a further object of the present invention to provide a method and a transmission system, which uses an RBC scheme having a reduced computational complexity and memory requirements compared to existing RBC schemes.

These objects and others are obtained with a method combining RBC with a continuous tone compression algorithm, e.g. JPEG, and/or DCT (Discrete Cosine Transform). Thus, for PIT, in the first stages of the transmission, some RBC algorithm is used, which has been found to provide images of good visual quality at this stage, i.e. when compressed at a high compression ratio. The RBC scheme can consist of the following steps:

(a) segment the image in a number of regions; code and transmit the contour image (and possibly the mean value of the pixels in each region);
(b) calculate a few (more) basis functions (if these are not pre-calculated);
(c) calculate the corresponding texture coefficients;
(d) quantize, code and transmit the coefficients;
(e) if extra information is required by the decoder, then go to stage (b), else stop transmission.

If at any stage of the transmission, the visual result achieved by the RBC scheme is not significantly better than the result achieved by a continuous tone compressor, like JPEG, then more information is transmitted but this time compressed using a continuous tone compressor, e.g. JPEG algorithm (if an image at lower compression ratio is required from the receiver). In order to utilise the information already transmitted when using the RBC algorithm, the following procedure is performed at the transmitter for a grey scale image using 8 bits per pixel:
1. Create a new image by taking the pixel value difference between the original image and the image reconstructed with RBC at that stage.
2. Add 128 to each pixel value of the difference image obtained.
3. Truncate or clip all pixel values of the difference image obtained into the range [0, 255], i.e. let every value less than 0 be equal to 0 and every value larger than 255 be equal 255.
4. Compress the resulting difference image with the continuous tone compression algorithm, e.g. a JPEG algorithm, at a compression ratio such that the total number of transmitted bits for the RBC compressed image and the JPEG compressed image becomes approximately equal or less than the number of bits needed to be transmitted for obtaining an image having a desired visual quality, if solely compressed with the continuous tone compression algorithm.

The difference image can of course be compressed with JPEG, or another method, without restricting the number of bits to be equal or less than if the continuous tone compression algorithm would have been applied. A method for coding the difference image can be based also in variable block size DCT, as described in Y. Itoh, "An edge-oriented progressive image coding", IEEE Trans. on Circuits and Systems for Video Technology, Vol. 6, No. 2, April 1996, pp. 135–142.

Notice also that the adding of +128 might not be necessary (and in that case the values will not have to be clipped into the range [0, 255]) if the continuous tone compressor used can handle the pixel values after the difference operation. A progressive image transmission method can also be used for coding the difference image, and it will preferably be based on JPEG or a DCT-based scheme. Other suitable coding schemes for coding difference images can of course also be used. In the following it is assumed that JPEG is used for coding the difference frames but not excluding the possibility of using any other continuous tone algorithm.

In order for the receiver to make use of the received image the receiver executes the following process:
1. Receive the compressed difference image.
2. Reconstruct the received difference image with use of the continuous tone coding algorithm, e.g. JPEG.
3. Subtract 128 from each pixel value of the JPEG reconstructed difference image.
4. Add the resulting image of step 3 to the RBC reconstructed image.

Notice also that the subtracting of +128 might not be necessary if this was not used at the encoder side.

In order to obtain a better visual quality in the first stages of the transmission, the RBC algorithm used can be modified to a hybrid RBC-DCT (Discrete Cosine Transform) algorithm. The hybrid RBC-DCT divides the segmented image into rectangular blocks. The blocks, which are fully contained within a region of the segmented image are then coded using DCT base functions or other predefined base functions, such as Discrete Fourier Transform (DFT) base functions resulting in a hybrid RBC-DFT scheme.

The remaining part of the regions and the other regions in which rectangulars can not be fitted are coded using orthogonal or orthonormal base functions, such as in particular weakly separable (WS) base functions, or other base functions (even non-orthogonal). The contours of these rectangular blocks do not need to be transmitted, since the division into blocks can be performed by the receiver without any information from the transmitter.

It should be noted that the remaining part of the regions in which rectangulars are not fitted, can be checked to see if it can be considered as part of one region or if it has to be divided into separate sub-regions. In such a case each of the sub-regions is coded with base functions or in another way for coding non-rectangular shapes.

For example, the pixel values can be quantized and coded, or a bit-plane coding scheme could be used. As an option, the set of base functions can be adapted to the properties of the sub-region. For example, if smooth parts exist, then polynomials can be used. If textured parts are found, then cosine base functions can be used. It should be noted that in the case when the region is relatively big, for example a human body, the following will be the case:

The remaining part of the object, i.e. the parts in which it was not possible to fit rectangulars, consists of different parts (sub-regions), i.e. parts of the head, parts of the hands, parts of the legs, etc. In such a case these sub-regions can be identified and the RBC coding, for example the polynomial representation, can be applied in these sub-regions.

Thus, in the first stages of the image transmission, at high compression ratios, a hybrid RBC-DCT method is used, due to the ability of the RBC algorithms to provide an image having a higher quality than JPEG at this stage. If more information is required, i.e. an image having a higher quality is demanded by the receiver, then this additional information is transmitted using JPEG or another continuous tone compression algorithm.

It should be noted that in the first stages of the transmission, any RBC scheme utilising any segmentation technique can be used. In applications in which presegmented images are provided, then no segmentation is required. It also to be noted that the switching scheme may not be required and the image can be compressed solely by RBC or the hybrid RBC-DCT scheme or in a progressive mode.

The images may also be colour images or have other numbers of bits per pixel, and are then compressed using a similar technique.

BRIEF DESCRIPTION OF THE DRAWINGS

The present invention will now be described in more detail and with reference to the accompanying drawings, in which:

FIG. 4 is a block diagram illustrating the different steps performed when coding a difference image.

FIG. 5 is a block diagram of the steps involved in an RBC decompressor.

FIG. 6 is a block diagram of the steps performed in a decompressor when decompressing a different image.

DESCRIPTION OF PREFERRED EMBODIMENTS

Figure 1:
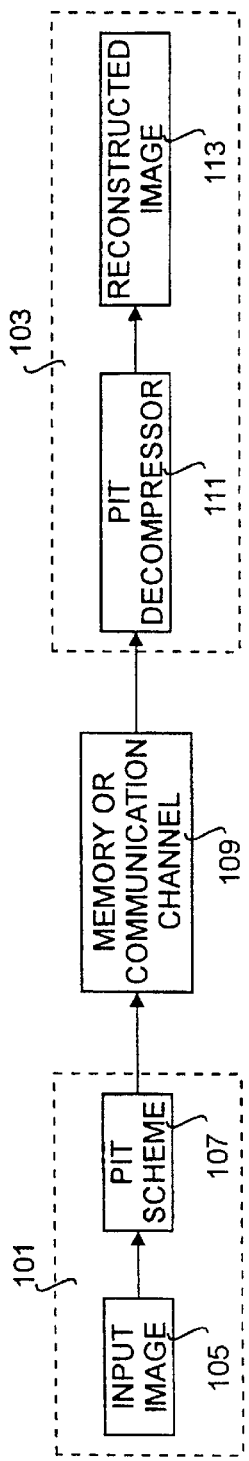
FIG. 1 is a general block diagram of a transmission system for still images using an RBC based transmission scheme.

In the following example a grey scale image having 8 bits per pixel is used as an original image, colour images are however not excluded. In FIG. 1, a block diagram of a transmission system using a progressive image transmission scheme is shown. The transmission system consists of a transmitting part 101 and a receiving part 103. The transmitting part comprises an input block 105 and a PIT type compression block 107. The PIT compressed image is transmitted on a transmission channel or to a memory 109 and received by the receiving part 103 comprising a PIT decompressor 111 and an output for the reconstructed image 113.

Figure 2:
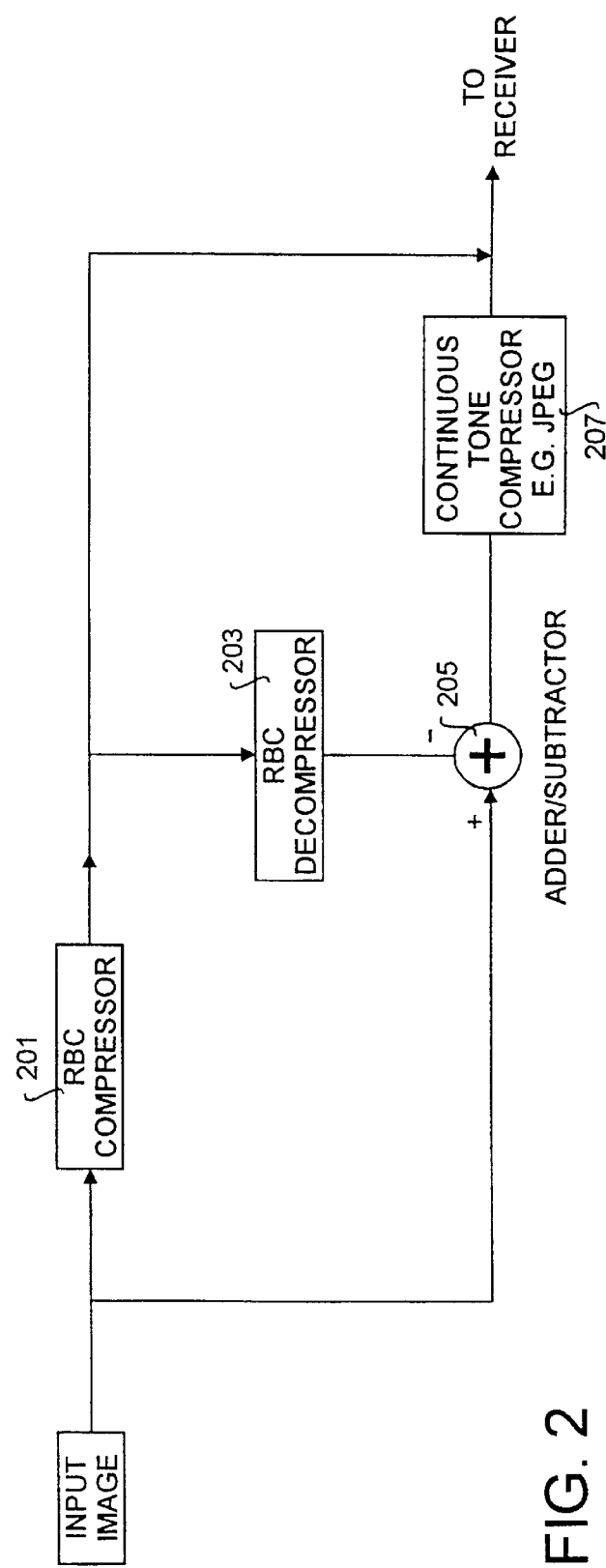
FIG. 2 is a block diagram of a transmitter using a combined RBC-JPEG compression scheme.

In FIG. 2, the processing blocks of the PIT block 107 are shown. Thus, first the image is compressed using an RBC scheme in a block 201 comprising an RBC compressor. The image coded according to the RBC algorithm in block 201 is then transmitted. The RBC algorithm used can be any algorithm suitable to the type of image transmitted, such as the methods described in: M. Gilge, "Region-orientated transform coding (ROTC) of images", Proc. of ICASSP 90, Albuquerque, N.M., April 1990, pp. 2245–2248 and W. Philips, C. A. Christopoulos, "Fast segmented image coding using weakly separable bases", Proc. of ICASSP 94, Adelaide, Australia, Apr. 19–22, 1994, Vol. V, pp.345–348.

Also, the transmission scheme of the first stages of the transmission can be implemented in a manner similar to the method described in Sikora T., and Makai B., "Shape-adaptive DCT for generic coding of video", IEEE Trans. on Circuits and Systems for Video Technology, Vol. 5, No. 1, February 1995, pp 59–62.

The PIT is continued with the RBC compression technique until either the receiver (user) decides that he/she does not want an image having a better visual quality or to the point where, at the same compression ratio, other, simpler compression techniques, using a continuous tone compressor, such as in this case JPEG, can provide the user with an image having better or equally good quality. The decision can also be made on a Signal to Noise Ratio (SNR), Mean Square Error (MSE) or another criterion and can be decided at the transmitter.

As an alternative, the switching from RBC based compression to continuous tone compression can be chosen to not be performed, if the receiver or the transmitter does not want so.

For example, the receiver might be interested in details in a particular region or regions of the segmented image. In that case, complete RBC or the hybrid RBC-DCT scheme can be used for that/those region(s).

Other coding methods for coding the difference image than JPEG can hence also be applied, such as a Block Transform Coding (BTC) method, vector quantization method, wavelet methods, the shape adaptive DCT referred above, etc., which then could use DCT applied to 8×8, or 16×16 pixels blocks or blocks of bigger sizes.

If the latter of the cases above is at hand, i.e. a JPEG compressed image (if JPEG is the continuous tone compressor used) is not inferior to an RBC compressed image at the compression ratio at a certain stage of the transmission, the transmitter switches to perform the further PIT with use of JPEG. In order not to lose the information contained in the image already transmitted using the RBC, the RBC compressed image at that stage is decompressed by a decompressor in a block 203.

It is also possible to code certain regions with different methods using a different coding scheme than an RBC scheme, i.e. different coding method can be used for different regions. For example, some regions can be coded lossless while others lossy. This can be decided either at the transmitter or at the receiver. For example, while an image is received in a progressive mode, it is possible to point at a region for which a perfect reconstruction is desired. Such an operation will then signal information to the transmitter, instructing the transmitter to perfectly reconstruct that particular region.

Therefore, at the final stage of the transmission, a lossless technique can be used for that region. Or alternatively, some regions are transmitted/stored in a progressive, or non-progressive mode, so that the final reconstruction to be lossless. This is useful in many medical applications.

The image obtained from the decompression is subtracted from the original image in a block 205. The image obtained is then compressed by a continuous tone compressor, such as in this case a JPEG compressor. This is performed in block 207, the further details of which are described with reference to FIG. 4 below.

Furthermore, progressive transmission can also be achieved by increased pixel accuracy. For example, when one has the RBC coefficients, for each coefficients the 4 most significant bits are transmitted at the beginning. Then the least significant bits are transmitted in following stages. Thereupon additional coefficients are calculated if required. Switching to the continuous tone processor is also performed if required.

Figure 3:
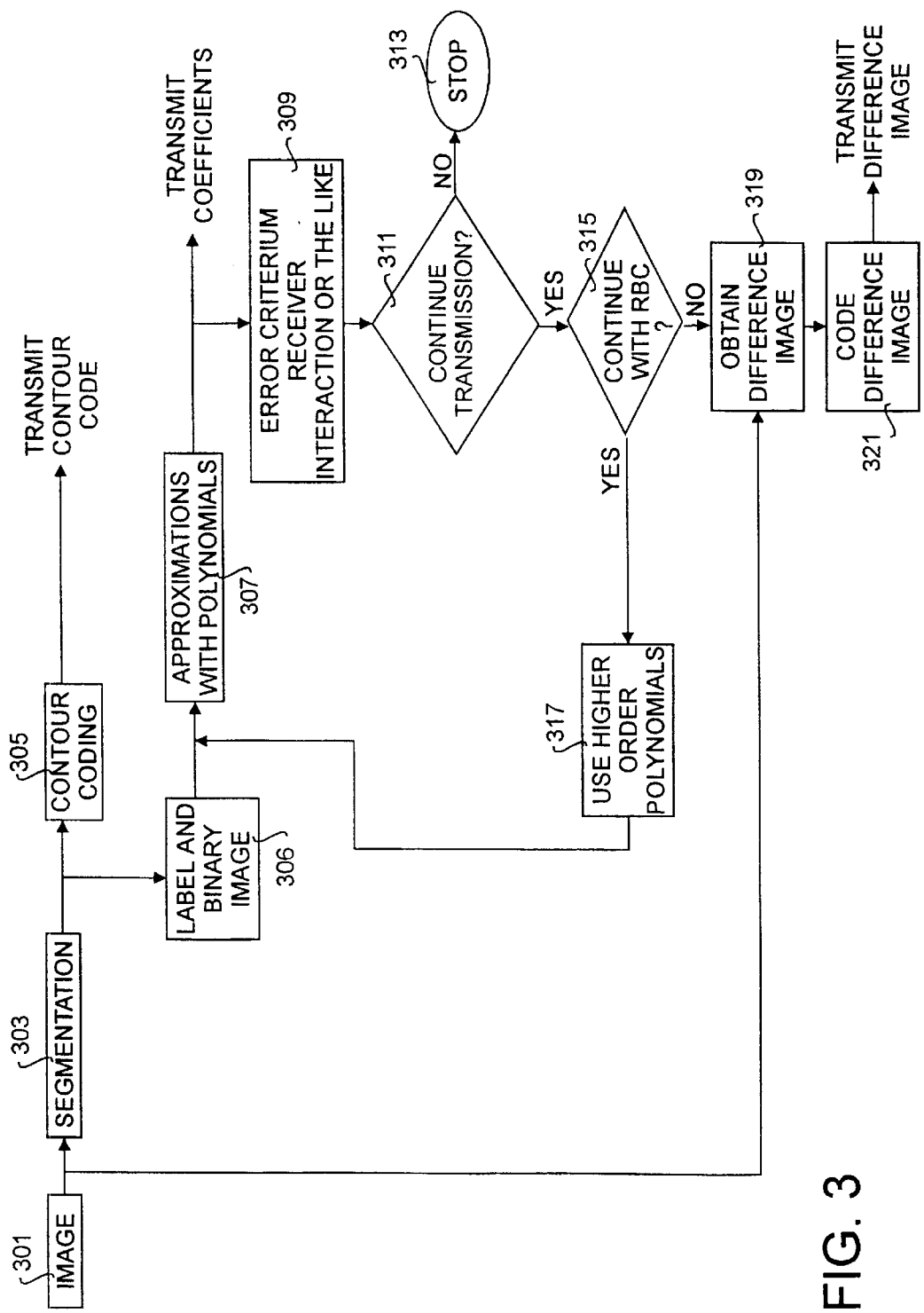
FIG. 3 is a flow chart of the logic steps performed in the transmitter of FIG. 2.

In FIG. 3, a flow chart of the steps performed in a transmitter using the combined RBC—JPEG scheme is shown. Thus, an image that is to be transmitted can be compressed as follows. First the image is accessed at a block 301. Then the image is segmented in a block 303. The contours of the regions of the segmented image are then coded in a contour coding block 305 and the contours are transmitted. The algorithm used can be any suitable segmentation algorithm.

Also, the contour coding technique used can be lossless as well as lossy. Notice that both the transmitter and receiver have to use the same contour information. The segmented image is also supplied to the block 307, via a block 306 which provides a label and binary image. In block 307 the inner parts of the regions are approximated with polynomials, or a suitable set of basis functions or even simple quantization of the values of the pixels.

In the block 306 a binary contour image is produced and also the label image. The label image is an image providing the pixels of the image with an identification, so that all pixels within the same region of the segmented image have the same identification reference, e.g. all pixels of one region have the identification 1, all pixels of a second region have an identification 2, etc.

The base functions used for generating the polynomials can be any set of base functions. In the description below the weakly separable (WS) base functions described in W. Philips and C. A. Christopoulos, "Fast segmented image coding using weakly separable bases", Proc. of ICASSP 94, Adelaide, Australia, Apr. 19–22, 1994, Vol. V, pp. 345–348, are used.

The RBC coding part preferably comprises the following steps:
(a) segmentation of the image in a number of regions; coding and transmission of the contour image, and possibly the mean value of the pixels in each region;
(b) calculation of a few (more) basis functions;
(c) calculation of the corresponding texture coefficients;
(d) quantization, coding and transmission of the coefficients;
(e) if extra information is required by the decoder, then go to stage (b), else stop transmission.

Thereupon, the coefficients of the polynomials are transmitted. The transmitter is then provided with feedback information from the receiver in the block 309. Based upon the feedback information, a decision is made in the block 311 whether the transmission is to be continued or not. If a decision is made to stop the transmission, the transmitter proceeds to a block 313 in which the transmission is terminated.

If, on the other hand, the transmission is decided to be continued, the scheme proceeds to a block 315. In the block 315 it is decided whether it is advantageous to continue with the RBC scheme or if the further transmission shall be performed with a JPEG compression algorithm or some other continuous tone compression algorithm.

The decision is based upon the performance of the two different schemes with the compression ratio at the stage of the transmission when the scheme reaches the block 315, i.e. if an image compressed with RBC outperforms a JPEG image at that compression ratio the decision is yes, and otherwise the decision is no.

The decision in the block 315 is based on a predefined criterion, e.g. a subjective criterion or a criterion such as SNR or MSE, and the criterion is evaluated every time the scheme reaches the block 315. If the decision in block 315 is yes, i.e. the RBC will provide better quality at a lower compression ratio, and the scheme proceeds to block 317, where it is decided that higher order polynomials shall be used.

As an alternative, if the criterion used can not be evaluated each time, a threshold value can be put to a quantative criterion, which can determine when during the transmission the switch between the RBC and the continuous tone compression, like JPEG in this case, is to be performed. Also, the point at which the switch between the two different compression methods is to be performed can be based on experience obtained in the transmitter, i.e. the transmitter is provided with information that at a certain compression ratio it is advantageous to switch between the different schemes.

One way to detect whether JPEG or RBC scheme perform better at a certain stage of the transmission, is by running JPEG and RBC in parallel. This however would be inefficient from a computational point of view, but it can be efficient when compressing images for storage and compression efficiency is the most important aspect.

Therefore, the following more practical but suboptimal technique can be used: JPEG is switched to after computing a fixed number of RBC coefficients. For example, the maximum number of coefficients to be calculated in a region may be 20% of the number of points in that particular region. Experiments show that this suboptimal approach is a reasonable compromise.

Thereafter, the scheme returns to the block 307 in which the regions of the image are approximated with polynomials, which this time have a higher order than the last time. The higher order coefficients are then transmitted and the scheme proceeds to the block 309 as before. However, if in block 315 the decision is no, i.e. it is decided that an RBC image will not provide a better image at a lower compression ratio, the scheme proceeds to a block 319.

In the block 319 a difference image is obtained by means of subtraction of the pixel values of the reconstructed, decompressed RBC image from the corresponding pixel values of the original image. Then the difference image is coded in a block 321. The coding scheme of block 321 is described in more detail below with reference to FIG. 4.

In FIG. 4, a coding scheme for the difference image is illustrated. The difference image, i.e. the reconstructed RBC image subtracted from the original image, enters the scheme at a block 401. The difference image is then supplied to an addition block 403. In the addition block the value 128 is added to each pixel value of the difference image.

Then in a block 405 the pixel values of the image obtained by block 403 are put into the range of the original image, i.e. in this case in the range [0, 255]. This is obtained by letting all pixel values less than zero adopt the value zero and by letting all pixel values more than 255 adopt the value 255. Thus an image having pixel values within the range [0,255] is obtained.

The image is then compressed with an 8 bit continuous tone compressor at a suitable compression ratio in the block 407. The compression can also be done in a progressive mode and can also be a lossless compression algorithm. In the latter case, lossless progressive image transmission can be achieved, which can be useful in applications like telemedicine.

FIGS. 5 and 6 illustrate the different steps performed at the receiving end of a transmission system when receiving and decompressing an RBC image and a difference image compressed according to the scheme described with reference to FIG. 4, respectively. Thus, in FIG. 5 the received image is decoded according to a suitable RBC algorithm, i.e. an algorithm corresponding to the compression algorithm used. The compressed image is received in block 501 and is reconstructed in a normal, state of the art manner in the block 503.

If, on the other hand, the received compressed image is a JPEG compressed difference image as described with reference to FIG. 4, the image is decompressed according to the scheme illustrated in FIG. 6. First the JPEG compressed difference image is received in a block 601. Then the difference image is decompressed using a conventional JPEG decompression algorithm in a block 603.

From each pixel value of the decompressed image, the value 128 is then subtracted. This is performed in the block 605. Thereafter, in the block 607, the image obtained in block 605 is added to the already received RBC reconstructed image, which has been decompressed according to the scheme described in association with FIG. 5.

Thus, a grey scale image having 8 bits per pixel has been transmitted in a PIT manner involving at least two steps and using approximately the same number of bits as if the image had been transmitted in one step only using the JPEG algorithm. The final reconstructed image of the transmission then provides an image at the receiver having a quality similar to the case where the image had been transmitted using only JPEG or progressive JPEG algorithm.

If an image having a number of bits per pixel different from 8 is to be transmitted using the scheme described above some modifications must be made.

The method is applied in the same manner as stated above. However, if the JPEG compression algorithm is to be used in the latter stages, it must first be made sure that the JPEG will handle such a type of image, e.g. an image having 12 or 16 bits per pixel. Then the compression and decompression algorithms must be adjusted so that the added and subtracted value respectively, is not 128 but $2^{m-1}$, where m is the number of pixels used for the grey scale image.

Also, if the number of bits per pixel in the original image is different from 8, the range into which the difference image is put or clipped, must be modified, so that the difference image is within the range of the original image, i.e. the pixel values are put into the range $[0, 2^m-1]$.

Above an example of a scheme used for grey images has been described. However, the scheme works for colour images as well, as will be described below.

A colour image is defined as having N bits per colour band, where N is a positive integer. A typical colour image is represented by 3 colour bands each having 8 bits, i.e. a total of 24 bits per pixel.

When the compression scheme described above is applied to colour images, the same scheme as described above could be employed for each colour band separately. However, if the 3 colour bands representing a colour image are others than the YUV colour space, e.g. the RGB (Red Green Blue) colour space, it can be advantageous to perform a transformation to the YUV colour space, where Y is the luminance component and U and V are the chrominance components, since most of the energy of a YUV colour image is concentrated to the Y component, or another suitable colour space. As an alternative, the compression scheme as an alternative can be performed as described below with reference to FIGS. 7 and 8.

Figure 7:
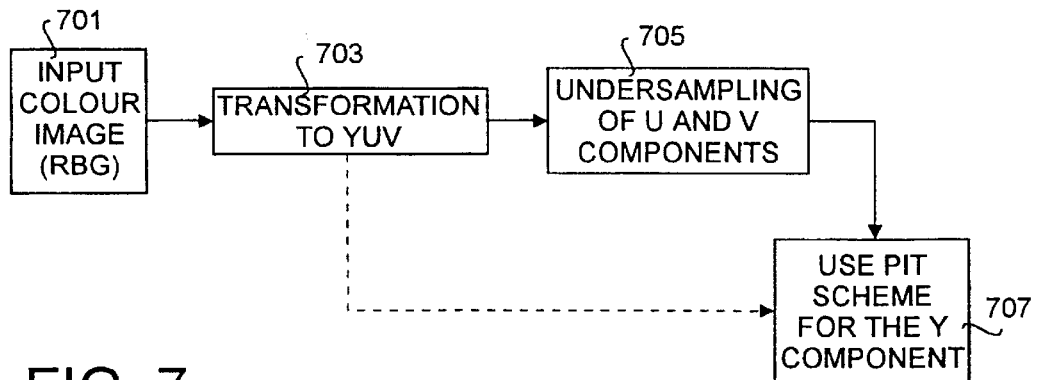
FIG. 7 is a flow chart illustrating the logic in a transmitter for a colour image.
Figure 8:
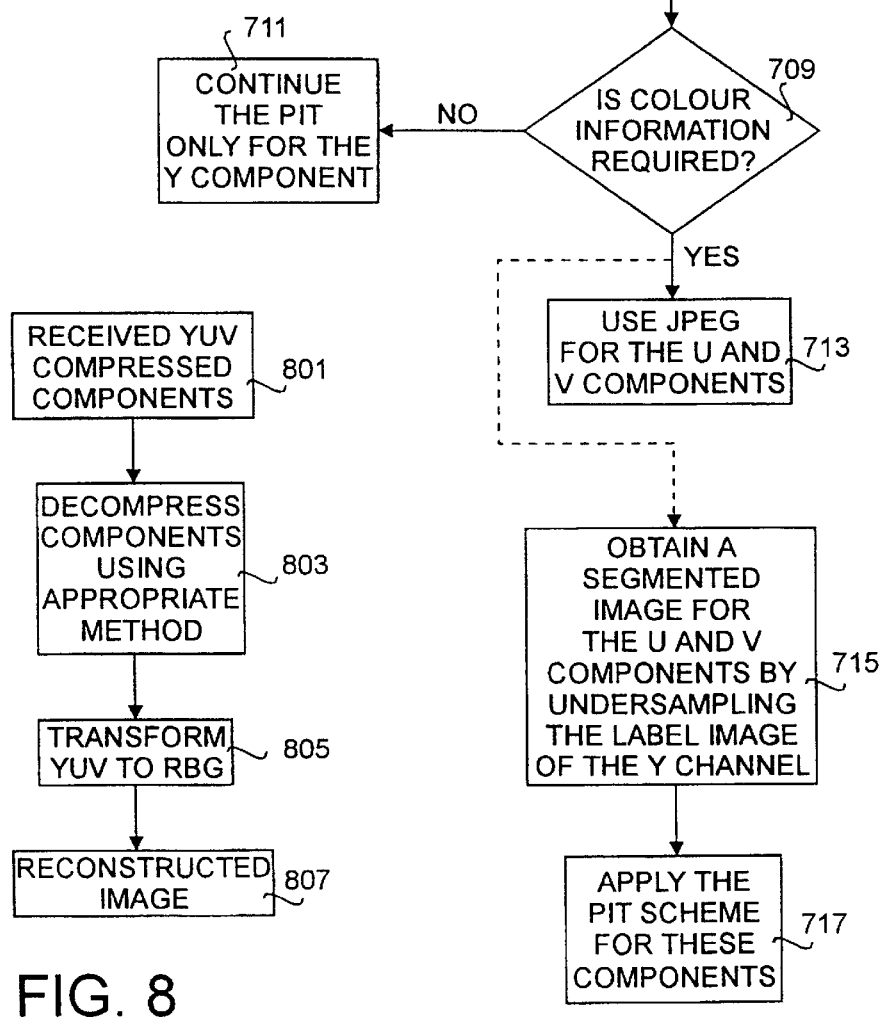
FIG. 8 is a block diagram of the steps performed in a receiver when receiving colour images.

In FIGS. 7 and 8 a transmitting part for a transmission system for compressed images and a receiving part for such a system are shown respectively. Thus, in FIG. 7 block 701 represents the input of a colour image represented by the RGB colour components. The RGB colour image is then transformed into a YUV colour image in a block 703.

In block 705 the U and V components of the image are undersampled (after appropriate low-pass filtering), i.e. the size of the image is reduced, for example a 512×512 pixel image is reduced to a 256×256 pixel image by an under sampling by two in each dimension, so that only the Y component is transmitted during the initial stages of the transmission. The above described RBC-JPEG algorithm is then performed for the Y component in block 707.

The undersampling of the U and V colour components performed in the block 705 is optional. Also, the segmentation performed on colour images can be performed only on the Y component image or on the entire colour image involving all the three components, by using appropriate techniques.

If the receiver during any stage of the transmission decides that he/she wants the other colour components transmitted, such a request is transmitted to the transmitter, which in a block 709 continuously checks whether such a request has arrived. If the decision in block 709 is no the PIT is continued for the Y component only, block 711. If the decision is yes the scheme switches to transmit the U and V components using the JPEG algorithm, or any continuous tone compressor, block 713. An alternative scheme would be to transmit information for all components at each stage, without expecting the receiver to ask for it, so that the receiver at each stage reconstructs a colour image as well.

An alternative scheme is to use RBC for the U and V components too. Thus, if the decision in block 709 is yes the scheme continues to block 715 in which a segmented image for the U and V components is obtained by under sampling the label image of the Y component image. Then in block 717 the PIT scheme is applied to the U and V components.

Also, the first stage of the transmission of the three components of the colour image can consist of transmission of such a segmented image, in which the pixel values of each region are replaced by the mean, or median colour of the pixels in each region of the colour image.

In FIG. 8 the receiving part of a colour image transmission system is illustrated. The compressed YUV colour image is received in a block 801. The components of the image are then decompressed by means of an algorithm corresponding to the compression algorithm used, i.e. the RBC algorithm or the JPEG algorithm, in the block 803. Thereafter, the YUV colour image is transformed into an RGB colour image in a block 805, and the reconstructed colour image is then available in the block 807.

Figure 9:
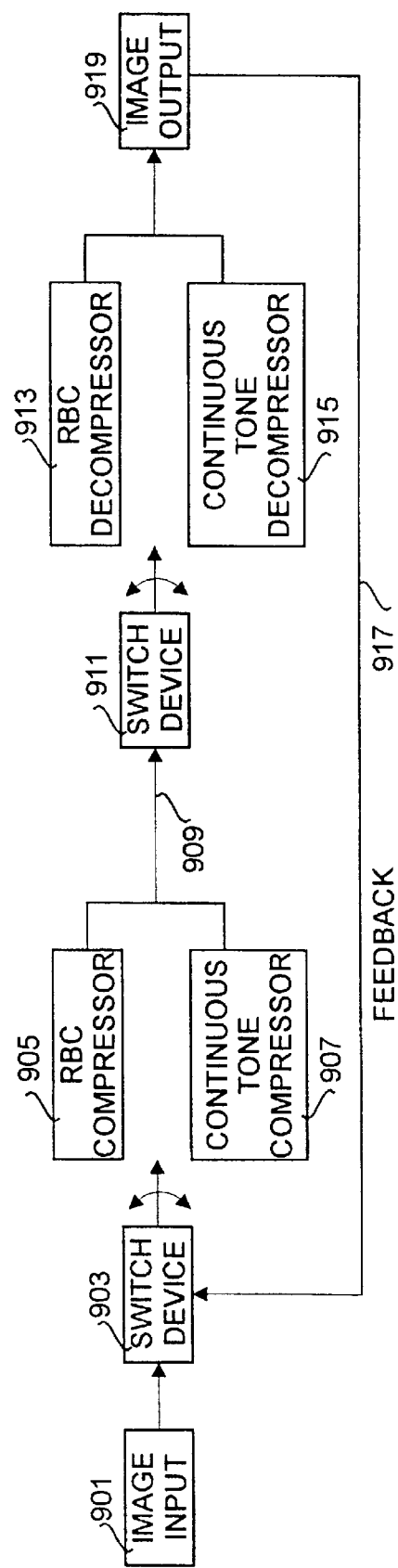
FIG. 9 is an schematic view of a transmission using a scheme switching between compression by means of an RBC algorithm and by means of a continuous tone compression algorithm.

Finally, FIG. 9 is a schematic diagram illustrating the basic concept of the above described transmission schemes. Hence in block 901, an original image is fed to the transmission system.

The image is then transmitted to a block 903, in which a switching means decides which algorithm shall be used at that stage of the PIT. Based upon the decision taken in the block 903, the image is compressed either by an RBC compressor in block 905 or a continuous tone compressor in the block 907. The compressed image is then transmitted according to a PIT scheme on the channel 909 to a receiver comprising a block 911 which identifies which compression algorithm has been used and directs the received image to the appropriate decompressor.

In the schemes described above the transmitter always starts with compression according to an RBC algorithm and then, in some cases, switches to a continuous tone compression. In such a case the switching in the receiver can be implemented by means of transmitting a code word from the transmitter to the receiver when the compression algorithm is switched, and that the receiver then has a means in the block 911 for detecting such a code word and performs a switch at the reception thereof.

The decompression is then performed by an appropriate decompressor, either an RBC decompressor in block 913 or a continuous tone decompressor in a block 915. The image is then reconstructed and presented to a user in a block 919, which can be equipped with a feedback line 917 to the switching means 903 in the transmitter in order to be able to command the transmitter to switch compression algorithm or to terminate the transmission of the image or even to point at certain regions of the image which should be reconstructed better.

One disadvantage of using polynomials for the reconstruction of the texture in a region is that polynomials reconstruct the image very slowly, i.e. a significant number of base functions is needed to get a clear improvement in image quality. This is due to the fact that large regions are preferred in RBC (in order to limit the number of bits which are assigned to contour coding) and due to the fact that an accurate reconstruction of the texture in a large region requires, relatively, many base functions. In order to eliminate this disadvantage, a second scheme which employs a hybrid RBC-DCT scheme instead of RBC in the first stages of transmission is applied.

In the above described compression schemes, the RBC algorithm used is modified into a hybrid RBC-DCT (Discrete Cosine Transform) algorithm, in order to obtain a better visual quality in the first stages of the transmission. This hybrid RBC-DCT algorithm is performed by dividing the segmented image into rectangular blocks. The size of such a block is in this example for a 256×256 pixels image preferred to be 16×16 pixels. However, larger or smaller blocks can be used.

The blocks, which are fully contained within a region of the segmented image are then coded using DCT base functions or other predefined base functions, such as DFT base functions, which will provide a hybrid RBC-DFT scheme, whereas the remaining part of the regions and the other regions in which rectangulars were not fitted are coded using weakly separable (WS) base functions, such as the one cited above in association with the description of FIG. 3 (block 307) or other ways suitable for coding arbitrary shaped regions.

The contours of these rectangular blocks do not need to be transmitted, since the division into blocks can be performed by the receiver without any information from the transmitter. It should be noted that the remaining part of the regions in which rectangulars were not fitted, can be checked to see if it can be considered as part of one region or if it has to be divided into separate sub-regions. Then each of the sub-regions is coded by the methods referred above.

The set of base functions can be adapted (although not necessary) to the properties of the sub-region. For example, in smooth sub-regions the polynomials can be used. In textured sub-regions, the cosine base functions can be used. Notice that in the case where the region is relatively big, for example a human body. The remaining part of the object, i.e. the human body in this case, where it is not possible to fit rectangulars, will consist of different parts (sub-regions), i.e. parts of the head, parts of the hands, parts of the legs, etc. In such a case these sub-regions can be identified.

A simple way to perform such an identification is to check the change in grey value or colour. Then, the RBC coding, for example the polynomial representation, is applied in these sub-regions. It should be noted that the division into sub-regions has to be transmitted to the receiver, if the receiver is not able to identify this division.

With this division into blocks, there is no need for calculating base functions for these blocks. Instead precalculated DCT base functions can be used for such a rectangular region or DFT or other transforms are used. This significantly reduces the computational complexity of the RBC algorithm used. Also the memory requirements are reduced with the hybrid RBC-DCT algorithm compared to an algorithm only using RBC.

Yet another way of dividing the segmented image into rectangular blocks is to start by dividing the image into rectangular blocks having a relatively large size, e.g. 64×64 pixels, and keep only those that are fully contained inside regions. Then the scheme is continued by dividing the segmented image into rectangular blocks having a smaller size, e.g. 32×32 pixels and keeping only those fully contained in regions and which are outside the larger rectangular blocks that were fitted during the first step of the division in rectangulars, i.e. outside the 64×64 blocks in this case.

This procedure is repeated until no more rectangular blocks can be added or to the stage when the predefined small size rectangular, e.g. 4×4 or 8×8, is reached. Other ways for dividing the segmented image into rectangular parts can also be used, for example a quadtree based division or variable block size division. For example, in the case where the quadtree division is used, the blocks produced from the quadtree division that are fully contained in a region, are coded with DCT. It should be noted that although the division is done into squares, it is possible to use other sizes such as 16×8, 32×8, etc. or even triangular shapes.

For example, if a region consists of 40 rows and 30 columns, a rectangular regions having the size 32×16 can be fitted inside such a region. At the end, the regions or the remaining part of the region in which blocks of the various sizes where not fitted, will be coded by a set of base functions, for example orthogonal base functions. It should also be noted that a check whether the remaining part of the region consists of different sub-regions can be carried out, and a coding thereof, separately. Notice also that if the part of the region (or the sub-region) in which rectangulars were not fitted is small, it can be represented by a small number of base functions, or even by the mean value.

Other division of the segmented image into regions having predetermined shapes can also be applied, like the one proposed by Sikora T. and Makai B., "shape-adaptive DCT for generic coding of video", IEEE Trans. on Circuits and Systems for Video Technology, Vol. 5, No. 1, February 1995, pp. 59–62. The mean value of the region can be subtracted from each added region (rectangular or not) in the segmented image, before it is coded by DCT, in order to reduce the information to be coded.

Thus, in the blocks in which DCT is used, the JPEG algorithm for PIT can be used, i.e. successive approximation or spectral selection. When the scheme then switches to use JPEG, the scheme can continue using the successive approximation or spectral selection methods for the blocks fully contained inside such a block, without using a difference image for such blocks, whereas JPEG approach, i.e. DCT based coding, is applied to the rest of the blocks of the image (in the difference image).

It should be noted that it can be avoided to code the whole difference image with JPEG. This can be performed as follows: If a block has been reconstructed well before the switch to JPEG is executed, i.e. the quality of such a block is satisfying, then there is no need to apply JPEG to that particular block. Therefor, a quantative measure, such as SNR, MSE, etc. can be used for check the result of each reconstructed block (at the encoder). In such a case coding of difference blocks can be avoided saving bits which then can be allocated for coding blocks which were not reconstructed well, or coding regions or parts of the regions in which rectangulars were not fitted.

It has also to be noted that the RBC and the hybrid RBC-DCT scheme can be combined. For example, in the first stages of the transmission the RBC can be used. Then, the combined RBC-DCT scheme can be used by adding rectangular blocks and coding the difference between the original block and the reconstructed block (part of the region) with a DCT scheme. Then the scheme can continue using RBC-DCT or switch to a continuous tone compressor like JPEG. Many different combinations of the schemes can be used.

Thus, a PIT scheme which combines the advantages of RBC and JPEG has been described. The proposed scheme can use approximately the same number of bits as if JPEG solely had been used from the beginning (in order to achieve similar quality at the final stage of the transmission and better quality during the first stages of the transmission) and at the same time provides the receiver with a quickly interpretable image giving him/her the possibility to abort further transmission of an unwanted image at an early stage of the transmission, whereby the transmission channel used is freed possible to use for other purposes.

The scheme as described herein can also be applied for the coding of still and moving images. In still image coding the hybrid RBC-DCT scheme can be used instead of a JPEG or a fully RBC scheme. In moving image compression, the hybrid RBC-DCT scheme can be used for coding I-frames and P- and B-frames. In moving image coding application, the RBC-DCT scheme as described herein can be applied for coding difference frames, i.e. those produced by subtracting the predicted frame from the original one.

What is claimed is:

1. A transmission method, in particular for use in progressive image transmission (PIT), characterised by using a region based coding (RBC) for compressing an image including the steps of obtaining a segmented image, and transmitting a digitised image from a transmitter to a receiver, and that at some stage of the PIT, the compression algorithm is switched to compressing the image with a continuous tone compression algorithm.

2. A method according to claim 1, characterised in that the RBC algorithm is switched to a continuous tone compression algorithm, when the image qualities of the two compression methods become equal, as measured by the same criterion.

3. A method according to claim 1, characterised by, when the switch from the RBC to continuous tone compression is executed, the following steps performed at the transmitter:
creating a new image, a difference image, by taking the pixel value difference between an original image and the RBC reconstructed image at that stage,
adding the value $2^{m-1}$, where m is the number of bits used for each pixel in the original image, to each pixel value of the difference image,
truncating all pixel values into the range $[0, 2^m -1]$,
compressing the difference image using a continuous tone compression algorithm and transmitting the compressed image,
and by the following corresponding steps performed at the receiver:
reconstructing the received difference image using a decompression algorithm corresponding to the continuous tone compression algorithm,
subtracting the value $2^{m-1}$ from each pixel value, and
adding the image to the RBC reconstructed image.

4. A method according to claim 1, characterised in that the segmented image is divided into rectangular regions/or regions of another, predefined shape before it is transmitted and that the regions that are fully contained inside a region of the segmented image are coded by means of predefined base functions.

5. A method according to claim 4, when the regions have rectangular shape, characterised in that the base functions in the rectangular regions used are DCT (Discrete Cosine Transform) or DFT (Discrete Fourier Transform) base functions.

6. A method according to claim 1, characterised in that the RBC scheme uses orthogonal or orthonormal base functions for coding the regions of the segmented image.

7. A method according to claim 1, characterised in that the segmented image is divided into rectangular regions before it is transmitted and that the rectangular regions that are fully contained inside a region of the RBC image are coded by means of predefined base functions.

8. A method according to claim 7, characterised in that the base functions used are DCT (Discrete Cosine Transform) or DFT (Discrete Fourier Transform) base functions.

9. A method according to claim 1, in the case where the image to be transmitted is a colour image, characterised in
that the colour image is transformed into a YUV image,
that only the Y component is transmitted using RBC at the initial stages of the transmission, and
that if the receiver/transmitter decides to accept/transmit the other colour components they are then transmitted.

10. A method according to claim 9, characterised in that the other colour components (U and V) are undersampled before they are transmitted.

11. A method according to claim 9, characterised in that during the first stage of the transmission, the segmented image and the mean or median colour of each region is transmitted.

12. A method according to claim 1, characterised in that the continuous tone compression algorithm used is JPEG or a DCT-based coding scheme.

13. A method of transmission, in particular progressive image transmission (PIT), using a region based coding (RBC) algorithm including segmentation of a digitised image to transmit the image from a transmitter to a receiver, characterised in that the segmented image is divided into regions having a predefined shape before it is transmitted and that the regions that are fully contained inside a region of the RBC image are coded by means of predefined base functions.

14. A method according to claim 13, characterised in that the base functions used are DCT (Discrete Cosine Transform) or DFT (Discrete Fourier Transform) base functions.

15. A transmitter for transmitting digitised compressed images according to a progressive image transmission (PIT) scheme compressed by means of an region based coding (RBC) algorithm, characterized by means in the transmitter for continuous tone compression and means for switching between compression with the RBC algorithm and the algorithm for continuous tone compression.

16. A transmitter according to claim 15, characterised by means for
creating a new image, a difference image, by taking the pixel value difference between an original image and an image RBC reconstructed image at that stage,
adding $2^{m-1}$, where m is the number of bits used for each pixel in the original image, to the difference image,
truncating all pixel values into the range $[0, 2^m -1]$, where m is the number of bits used for each pixel in the original image,
compressing the difference image with use of a continuous tone compressor and transmitting it.

17. A transmitter according to claim 16, characterised by means for dividing the segmented image into regions having a predefined shape before it is transmitted and for coding the regions that are fully contained inside a region of the segmented image by means of predefined base functions.

18. A transmitter according to claim 17, characterised by means for deciding, when the coding is switched to a continuous tone coding scheme, that no further information needs to be transmitted for some parts of the image.

19. A transmitter according to claim 17, when the regions have a rectangular shape, characterised in that the base functions in the rectangular regions used are DCT (Discrete Cosine Transform) or DFT (Discrete Fourier Transform) base functions.

20. A transmitter according to claim 15, characterised in that the RBC compressor uses orthogonal or orthonormal base functions for coding the regions of the image.

21. A transmitter according to claim 15, characterised by means for transmitting each colour component of a colour image independently.

22. A receiver for receiving digitised compressed images, characterised by means for receiving and decompressing images compressed by means of an RBC algorithm and images compressed by means of a continuous tone compression algorithm, and means for combining RBC compressed data and continuous tone compressed data for forming a complete output image.

23. A receiver according to claim 22 also having means for receiving a difference image, characterised by means for reconstructing the received difference image with a decompressor corresponding to the continuous tone compression algorithm used, subtracting $2^{m-1}$ from each pixel value, and for adding the image to the RBC reconstructed image.

24. A receiver according to claim 22, characterised by means for dividing the received image, which is divided into regions, into rectangular blocks.

25. A receiver according to claim 22, characterised by means for performing a switch between an RBC decompression and a continuous tone decompression upon receiving a code word.

26. A transmitter, in particular a progressive image transmitter, using a region based coding (RBC) to transmit a digitised image characterised by means for dividing the segmented image into regions having a predetermined shape before it is transmitted and means for coding the regions that are fully contained inside a region of the RBC image by means of predefined base functions.

27. A transmitter according to claim 26, characterised in that the base functions used are DCT (Discrete Cosine Transform) or DFT (Discrete Fourier Transform) base functions.

28. A transmission system, in particular for use in progressive image transmission (PIT), comprising a transmitter and a receiver, characterised by a region based coding (RBC) compressor and a continuous tone compressor for compressing a digitised image in the transmitter and means in the transmitter for transmitting the image to the receiver, and means in the transmitter for switching the compression with the RBC compressor to compress the image with the continuous tone compressor at some stage of the PIT.

29. A system according to claim 28, characterised by means in the transmitter for switching from the RBC compressor to the continuous tone compressor, when the image qualities of the two compressors become equal, as measured by the same criterion.

30. A system according to claim 28, characterised by means in the transmitter for:

creating a new image, a difference image, by taking the pixel value difference between an original image and the RBC reconstructed image at that stage, adding the value $2^{m-1}$ where m is the number of bits used for each pixel in the original image, to each pixel value of the difference image, truncating all pixel values into the range, compressing the difference image using a continuous tone compression algorithm and transmitting the compressed image, and by means in the receiver for:

reconstructing the received difference image with a decompression algorithm corresponding to the continuous tone compression algorithm, subtracting the value $2^m-1$ from each pixel value, and adding the image to the RBC reconstructed image.

31. A system according to claim 28, characterised by means in the transmitter for dividing the image into regions having a predefined shape before it is transmitted and by means in the transmitter for coding the regions that are fully contained inside a region of the image with predefined base functions.

32. A system according to claim 31, characterised in that means are designed to use DCT (Discrete Cosine Transform) or DFT (Discrete Fourier Transform) base functions.

33. A system according to claim 28, characterised in that the RBC compressor is designed to use orthogonal or orthonormal base functions for coding the regions of the image.

34. A system according to claim 28, characterised by means in the transmitter for dividing the image into regions having a predefined shape before it is transmitted and by means for coding the regions that are fully contained inside a region of the RBC image using predefined base functions.

35. A system according to claim 34, when the region have rectangular shape, characterised in that the means for coding the rectangular regions that are fully contained inside a region of the RBC image are designed to use DCT (Discrete Cosine Transform) or DFT (Discrete Fourier Transform) base functions.

36. A system according to claim 28, in the case where the image to be transmitted is a colour image, characterised by means for:

transforming the colour image into a YUV image, and transmitting only the Y component using RBC at the initial stages of the transmission.

37. A system according to claim 36, characterised by means in the transmitter for under sampling the other colour components (U and V).

38. A system according to claim 36, characterised by means in the transmitter for only transmitting a segmented image and the mean or median colour of each region during the first stage of the transmission.

39. A system according to claim 28, characterised in that the continuous tone compressor is a JPEG compressor.

40. A transmission system, in particular for progressive image transmission (PIT), using a region based coding (RBC) compressor including means for performing segmentation of a digitised image to transmit an image from a transmitter to a receiver, characterised by means in the transmitter for dividing the segmented image into regions having a predetermined shape before it is transmitted and by means for coding the regions that are fully contained inside a region of the RBC image using predefined base functions.

41. A system according to claim 40, characterised in that the means for coding the regions that are fully contained inside a region of the RBC image are designed to use DCT (Discrete Cosine Transform) or DFT (Discrete Fourier Transform) base functions.

42. A system for coding still images and/or video sequences comprising segmentation means, characterised in that segmented images are divided into regions having a predetermined shape before being coded and stored or transmitted and that the regions that are fully contained inside a region of such a segmented image are coded by means of predefined base functions.

* * * * *

UNITED STATES PATENT AND TRADEMARK OFFICE
CERTIFICATE OF CORRECTION

PATENT NO. : 6,031,572
DATED : February 29, 2000
INVENTOR(S) : CHRISTOPOULOS

It is certified that error appears in the above-indentified patent and that said Letters Patent is hereby corrected as shown below:

On the cover page, please correct the following:
-- [30] Foreign Application Priority Data

Mar. 5, 1996    [SE]    Sweden ........................... 9600853-7
    Oct. 31, 1996   [SE]    Sweden ........................... 9603979-7 --

Signed and Sealed this

Third Day of April, 2001

Attest:

NICHOLAS P. GODICI

*Attesting Officer*    *Acting Director of the United States Patent and Trademark Office*